(12) United States Patent
Mutter et al.

(10) Patent No.: US 11,838,145 B2
(45) Date of Patent: *Dec. 5, 2023

(54) COMMUNICATION CONTROL DEVICE AND TRANSMITTING/RECEIVING DEVICE FOR A SUBSCRIBER STATION OF A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/911,065

(22) PCT Filed: Apr. 8, 2021

(86) PCT No.: PCT/EP2021/059203
§ 371 (c)(1),
(2) Date: Sep. 12, 2022

(87) PCT Pub. No.: WO2021/213810
PCT Pub. Date: Oct. 28, 2021

(65) Prior Publication Data
US 2023/0111945 A1    Apr. 13, 2023

(30) Foreign Application Priority Data
Apr. 24, 2020    (DE) .................... 10 2020 205 257

(51) Int. Cl.
*H04L 12/40*    (2006.01)

(52) U.S. Cl.
CPC .. *H04L 12/40032* (2013.01); *H04L 12/40169* (2013.01); *H04L 2012/40215* (2013.01)

(58) Field of Classification Search
CPC ......... H04L 12/40032; H04L 12/40169; H04L 2012/40215
See application file for complete search history.

(56) References Cited

U.S. PATENT DOCUMENTS 7,882,298 B2 *    2/2011    Aue .................. H04L 12/40032
                                                                710/316
8,819,327 B2 *    8/2014    Hartwich .............. H04L 12/413
                                                                710/315

(Continued)

FOREIGN PATENT DOCUMENTS

DE    102006019305 A1    10/2007
DE    102016224961 A1    6/2018

OTHER PUBLICATIONS

ISO 11898-1:2015 Standard, "Road Vehicles—Controller Area Network (CAN)—Part 1: Data Link Layer and Physical Signalling," 2015, pp. 1-74.

(Continued)

*Primary Examiner* — Henry Tsai
*Assistant Examiner* — Christopher A Daley
(74) *Attorney, Agent, or Firm* — NORTON ROSE FULBRIGHT US LLP; Gerard Messina

(57) ABSTRACT

A communication control device for a subscriber station of a serial bus system. The communication control device has a communication control module for generating a transmitted signal for controlling a communication of the subscriber station with at least one other subscriber station of the bus system, in which bus system at least a first communication phase and a second communication phase are used for exchanging messages between subscriber stations of the bus system, a first terminal for transmitting, in an operating (Continued)

mode of the first communication phase, the transmitted signal to a transmitting/receiving device, a second terminal for receiving, in the operating mode of the first communication phase, a digital received signal from the transmitting/receiving device, and an operating mode switching module for switching the transmission direction of the first and the second terminal in the second communication phase to the same direction for differential signal transmission.

15 Claims, 5 Drawing Sheets

(56) References Cited

U.S. PATENT DOCUMENTS

| | | | | |
|---|---|---|---|---|
| 11,362,859 | B2* | 6/2022 | Yamamoto | H04L 12/40169 |
| 2009/0083463 | A1* | 3/2009 | Aue | H04L 12/40032 |
| | | | | 701/102 |
| 2015/0095711 | A1* | 4/2015 | Elend | H04L 12/4135 |
| | | | | 714/39 |
| 2021/0334233 | A1* | 10/2021 | Mutter | G06F 13/4282 |
| 2021/0336817 | A1* | 10/2021 | Mutter | H04L 12/40013 |

OTHER PUBLICATIONS

International Search Report for PCT/EP2021/059203, dated Jun. 30, 2021.

* cited by examiner

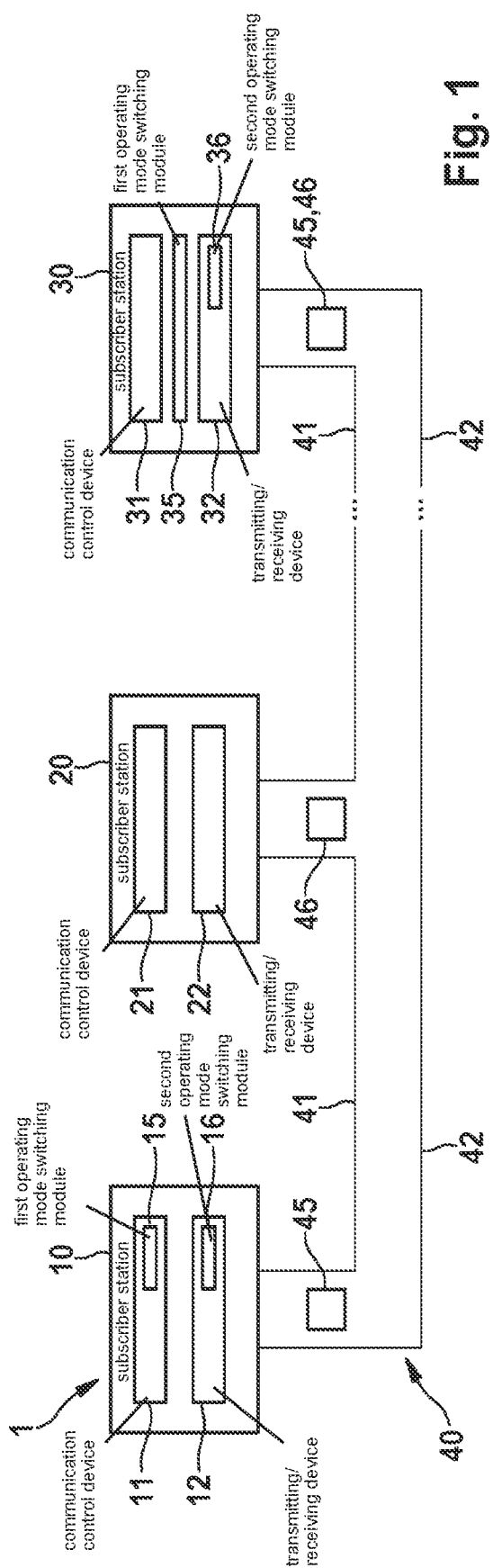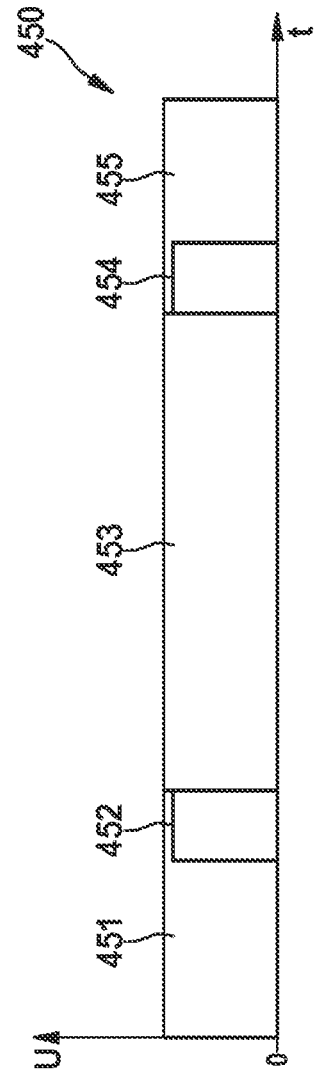

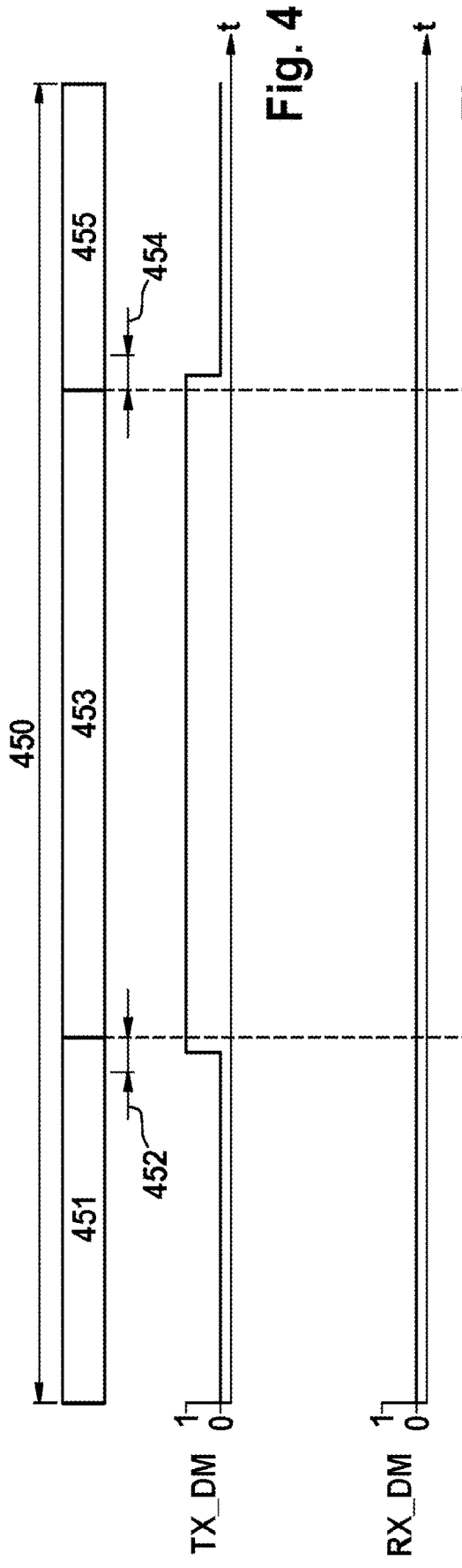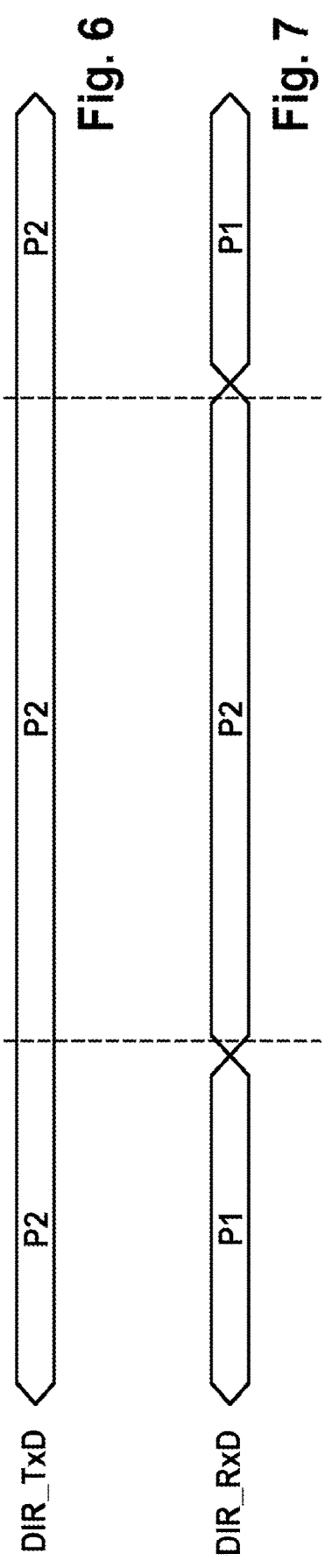

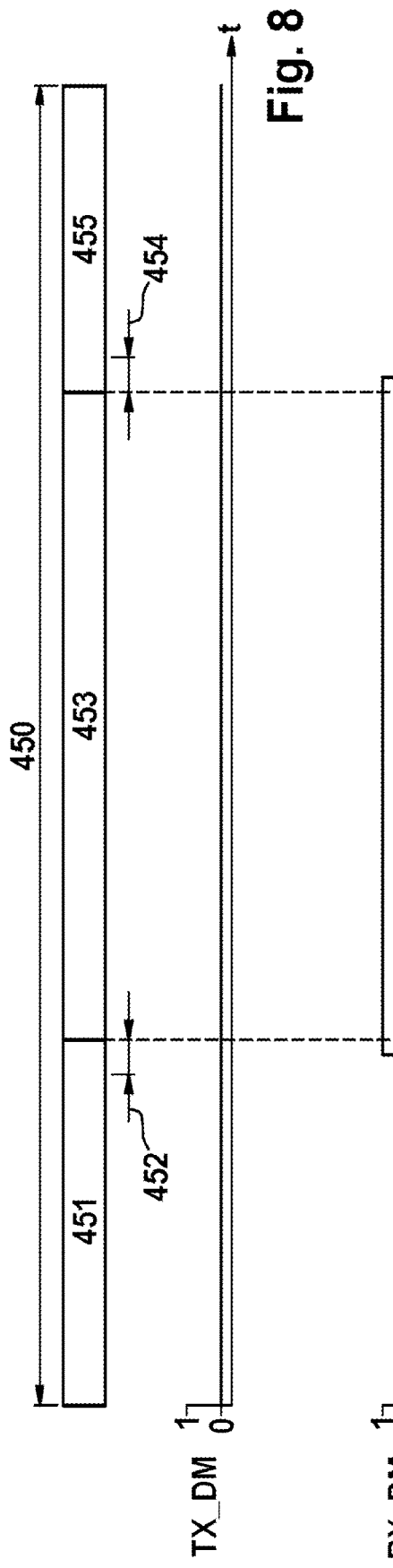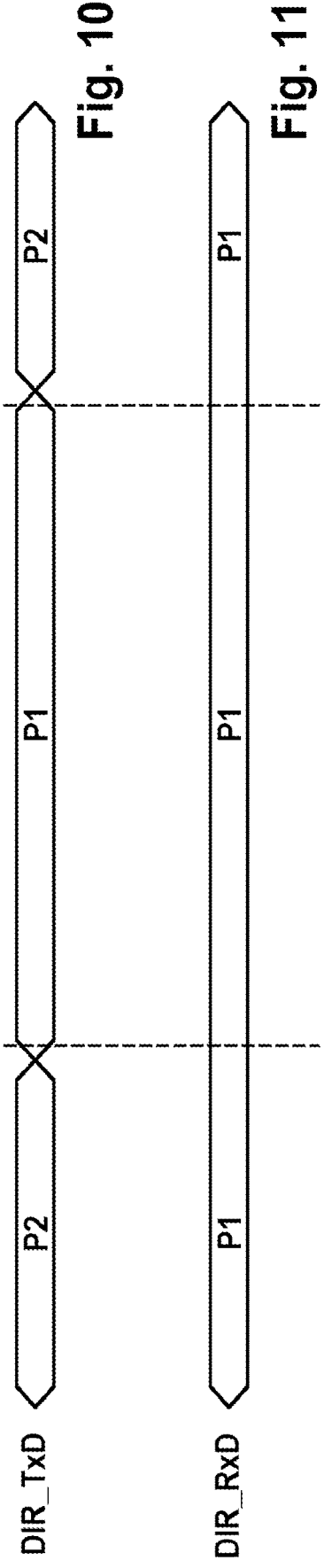

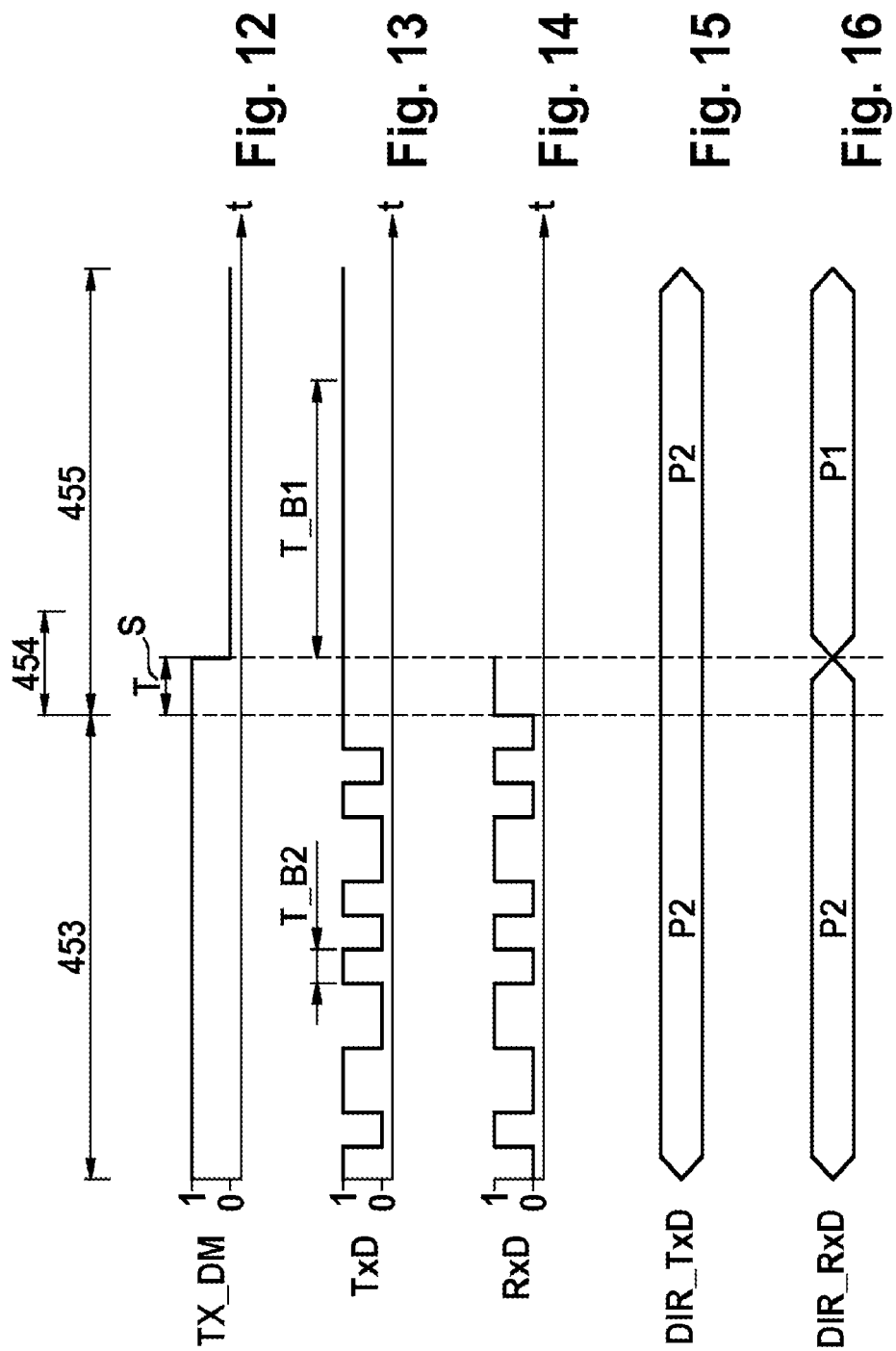

COMMUNICATION CONTROL DEVICE AND TRANSMITTING/RECEIVING DEVICE FOR A SUBSCRIBER STATION OF A SERIAL BUS SYSTEM AND METHOD FOR COMMUNICATION IN A SERIAL BUS SYSTEM

FIELD

The present invention relates to a communication control device and a transmitting/receiving device for a subscriber station of a serial bus system, and to a method for communication in a serial bus system operating at high data rate and a high level of error robustness.

BACKGROUND INFORMATION

For communication between sensors and control units, for example in vehicles, a bus system is frequently used in which data is transmitted as messages in the ISO 11898-1: 2015 standard as a CAN protocol specification with CAN FD. The messages are transmitted between the bus subscribers of the bus system, such as a sensor, a control unit, an encoder, etc.

In order to be able to transmit data at a higher bit rate than with CAN, there is an option in the CAN FD message format to switch to a higher bit rate within a message. Here, the maximum possible data rate is increased beyond a value of 1 Mbit/s by using a higher clock rate in the data field area. Such messages are hereinafter also referred to as CAN FD frames or CAN FD messages. With CAN FD, the user data length is extended from 8 to up to 64 bytes and the data transmission rates are significantly higher than with CAN.

In order to transmit data faster from the transmitting bus subscriber to the receiving bus subscriber than with CAN FD, a CAN FD successor bus system is currently under development; this is referred to as CAN XL. Here, in addition to a higher data rate in the data phase than with CAN FD, the user data length of up to 64 bytes previously achieved with CAN FD is also to be increased. However, the advantages of the robustness of a CAN-based or CAN FD-based communication network are also to be maintained in the CAN FD successor bus system.

The faster the data is transmitted to the bus, the higher the demands on the quality of the signal that the protocol controller of the subscriber station receives from the bus. For example, if the edge steepness of the bits of the received signal is too low, this may result in highly asymmetric bits, and thus the received signal is not able to be decoded correctly.

If the edge steepness of the bits of the received signal is increased, this results in excessive radiation. This leads to costs elsewhere, for example on the printed circuit board and in the microcontroller for the subscriber station.

SUMMARY

It is an object of the present invention to provide a communication control device and a transmitting/receiving device for a subscriber station of a serial bus system and a method for communication in a serial bus system which solve the aforementioned problems. In particular, a communication control device and a transmitting/receiving device for a subscriber station of a serial bus system and a method for communication in a serial bus system are to be provided with which a high data rate and an increase in the amount of user data per frame can be realized with a high level of error robustness.

The object may be achieved by a communication control device for a subscriber station of a serial bus system having the features of the present invention. According to an example embodiment of the present invention, the communication control device has a communication control module for generating a transmitted signal for controlling a communication of the subscriber station with at least one other subscriber station of the bus system, in which bus system at least a first communication phase and a second communication phase are used for exchanging messages between subscriber stations of the bus system, a first terminal for transmitting, in an operating mode of the first communication phase, the transmitted signal to a transmitting/receiving device designed to transmit the transmitted signal to a bus of the bus system, a second terminal for receiving, in the operating mode of the first communication phase, a digital received signal from the transmitting/receiving device, and an operating mode switching module for switching the transmission direction of the first and the second terminal in the second communication phase to the same direction for differential signal transmission via the first and the second terminal.

With the communication control device, it is possible to provide the required fast data transmission with very high bit symmetry for the CAN FD successor bus system without additional expensive terminals between the communication control device and the transmitting/receiving device.

In this case, the communication control device is advantageously designed in such a way that the symmetry of the bits is maintained in a received signal RxD that the transmitting/receiving device has generated from a signal received from the bus and transmits to the communication control device. This applies both to transmitting and to receiving CAN frames, i.e., for the transmitted signal TxD as well.

Furthermore, even when the received signal RxD is transmitted differentially between the transmitting/receiving device (transceiver) and the communication control device (microcontroller), non-return-to-zero (NRZ) encoding can be maintained. As a result, terminals (pins) with slow edges can now be used for data transmission between the transmitting/receiving device (transceiver) and the communication control device (microcontroller). The resulting lower edge steepness of the bits of the received and transmitted signal significantly reduces the radiation of the system.

Thus, an edge steepness of the bits of the received and transmitted signal can be selected such that the requirements for the radiation can be met without any problems. In addition, to maintain the symmetry of the signal, the communication control device does not need to use complex line coding techniques, such as PWM coding or Manchester coding. This reduces the complexity of data transmission and decoding of the transmitted signal TxD and the received signal RxD.

Furthermore, with the communication control device, arbitration of CAN can be maintained in one of the communication phases and nevertheless the transmission rate can again be considerably increased compared to CAN or CAN FD. This can be achieved by using two communication phases with different bit rates and by making the start of the second communication phase, in which the user data is transmitted at a higher bit rate than in arbitration, reliably identifiable for the transmitting/receiving device. Therefore, the transmitting/receiving device can safely switch from a first communication phase to the second communication phase.

As a result, a significant increase in the bit rate and thus the transmission speed from transmitter to receiver can be realized. At the same time, however, a high level of error robustness is ensured. This helps to realize a net data rate of at least 10 Mbps. Furthermore, the size of the user data can be larger than 64 bytes, in particular up to 2048 bytes per frame, or of any length as required.

According to an example embodiment of the present invention, the method performed by the communication control device can also be used if there is also at least one CAN subscriber station and/or at least one CAN FD subscriber station in the bus system that transmit messages according to the CAN protocol and/or CAN FD protocol.

Advantageous further embodiments of the communication control device are disclosed herein.

According to an example embodiment of the present invention, the operating mode switching module can be designed, in a first operating mode of the second communication phase, to switch the first and the second terminal as outputs and to generate an inverse digital transmitted signal from the transmitted signal and to output the transmitted signal at the first terminal and the digital transmitted signal inverse thereto at the second terminal. Additionally or alternatively, the operating mode switching module can be designed, in a second operating mode of the second communication phase, to switch the first and the second terminal as inputs and to generate a non-differential received signal from the differential received signal received at the first and the second terminal and to output it to the communication control module.

According to one exemplary embodiment of the present invention, the operating mode switching module is designed, in the first operating mode of the second communication phase, to generate and output the two transmitted signals with the same level at the two terminals for a predetermined time period, in order to signal to the transmitting/receiving device that the operating mode of the transmitting/receiving device is to be switched from the first operating mode of the second communication phase to the operating mode of the first communication phase.

According to one exemplary embodiment of the present invention, the operating mode switching module is designed to signal to the transmitting/receiving device via the first or second terminal that the transmitting/receiving device is to switch its operating mode from the operating mode of the first communication phase to a predetermined operating mode of the second communication phase.

For example, the communication control module is designed to generate the transmitted signal in the first communication phase with bits having a first bit time that is greater by at least a factor of 10 than a second bit time of bits that the communication control module generates in the transmitted signal in the second communication phase.

The aforementioned object is further achieved by a transmitting/receiving device for a subscriber station of a serial bus system having the features of the present invention. According to an example embodiment of the present invention, the transmitting/receiving device has a transmitting/receiving module for transmitting a transmitted signal to a bus of the bus system, in which bus system at least a first communication phase and a second communication phase are used for exchanging messages between subscriber stations of the bus system, and for generating a digital received signal from a signal received from the bus, a first terminal for receiving, in an operating mode of the first communication phase, a transmitted signal from a communication control device, a second terminal for transmitting, in an operating mode of the first communication phase, the digital received signal to the communication control device, and an operating mode switching module for switching the transmission direction of the first and the second terminal in the second communication phase to the same direction for differential signal transmission via the first and the second terminal.

The transmitting/receiving device provides the same advantages as previously mentioned with respect to the communication control device. Advantageous further embodiments of the transmitting/receiving device are disclosed herein.

According to an example embodiment of the present invention, the operating mode switching module can be designed, in a first operating mode of the second communication phase, to switch the first terminal and the second terminal as inputs and to generate a non-differential transmitted signal from the differential digital transmitted signal received at the first terminal and the second terminal. Additionally or alternatively, the operating mode switching module can be designed, in a second operating mode of the second communication phase, to switch the first and the second terminal as outputs and to generate an inverse digital received signal from the digital received signal and to output the digital received signal at the second terminal and the digital received signal inverse thereto at the first terminal.

According to one exemplary embodiment of the present invention, the operating mode switching module is designed, in the second operating mode of the second communication phase, to generate and output the two received signals with the same level at the two terminals for a predetermined time period, in order to signal to the communication control device additional information that is additional to information of the signals that are exchanged in the bus system with the messages between subscriber stations of the bus system.

Optionally, the transmitting/receiving module is designed to transmit the transmitted signal as a differential signal to the bus.

The operating mode switching module can be designed to select the transmission direction of the first and the second terminal depending on an operating mode into which the transmitting/receiving device is switched.

The above-described devices may further have a direction control block for controlling the transmission direction of the first and the second terminal depending on the operating mode of the transmitting/receiving device, an encoding block for encoding the differential signals, a decoding block for decoding the differential signal at the first and the second terminal into a non-differential signal, and a multiplexer for outputting the non-differential signal generated by the decoding block if the transmitting/receiving device is switched to an operating mode of the second communication phase.

According to one option of the present invention, the signal received from the bus in the first communication phase is generated with a different physical layer than the signal received from the bus in the second communication phase.

It is possible that, in the first communication phase, there is a negotiation as to which of the subscriber stations of the bus system will be given at least temporarily exclusive, collision-free access to the bus in the subsequent second communication phase.

The above-described communication control device and the above-described transmitting/receiving device may be part of a subscriber station of a bus system, which further comprises a bus and at least two subscriber stations, which are interconnected via the bus in such a way that they can communicate with each other in a serial manner. Here, at least one of the at least two subscriber stations has an above-described communication control device and an above-described transmitting/receiving device.

The aforementioned object may further be achieved by a method for communication in a serial bus system according to the present invention. According to an example embodiment of the present invention, the method is carried out with a subscriber station for a bus system, in which bus system at least a first communication phase and a second communication phase are used for exchanging messages between subscriber stations of the bus system, wherein the subscriber station comprises a previously described communication control device and a previously described transmitting/receiving device, and wherein the method comprises the steps of switching, with an operating mode switching module for the communication control device, the transmission direction of the first and the second terminal for the communication control device in the second communication phase to the same direction, and switching, with an operating mode switching module for the transmitting/receiving device, the transmission direction of the first and the second terminal for the transmitting/receiving device in the second communication phase to the same direction, which is different from the direction in which the first and the second terminal for the communication control device are switched, and carrying out differential signal transmission between the communication control device and the transmitting/receiving device via the first and the second terminal for the communication control device and the first and the second terminal for the transmitting/receiving device.

The method provides the same advantages as previously mentioned with respect to the communication control device and/or the transmitting/receiving device.

Other possible implementations of the present invention also include combinations, not explicitly mentioned, of features or embodiments described previously or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the accompanying figures and with reference to exemplary embodiments.

FIG. 1 is a simplified block diagram of a bus system according to a first exemplary embodiment of the present invention.

FIG. 2 is a diagram illustrating the structure of messages that can be transmitted by subscriber stations of the bus system according to the first exemplary embodiment of the present invention.

FIG. 4 to FIG. 7 are each a temporal representation of signals or states at the subscriber station of FIG. 3, if the subscriber station is the transmitter of a message transmitted via a bus of the bus system.

FIG. 8 to FIG. 11 are each a temporal representation of signals or states at the subscriber station of FIG. 3, if the subscriber station is the receiver of a message transmitted via the bus of the bus system.

FIG. 12 to FIG. 16 are each a temporal representation of signals or states at the subscriber station of FIG. 3 in a second exemplary embodiment, if the subscriber station is the transmitter of a message transmitted via the bus of the bus system in the data phase and switches back from the data phase to the arbitration phase.

In the figures, identical or functionally identical elements are given the same reference signs unless otherwise indicated.

DETAILED DESCRIPTION OF EXAMPLE EMBODIMENTS

Figure 3:
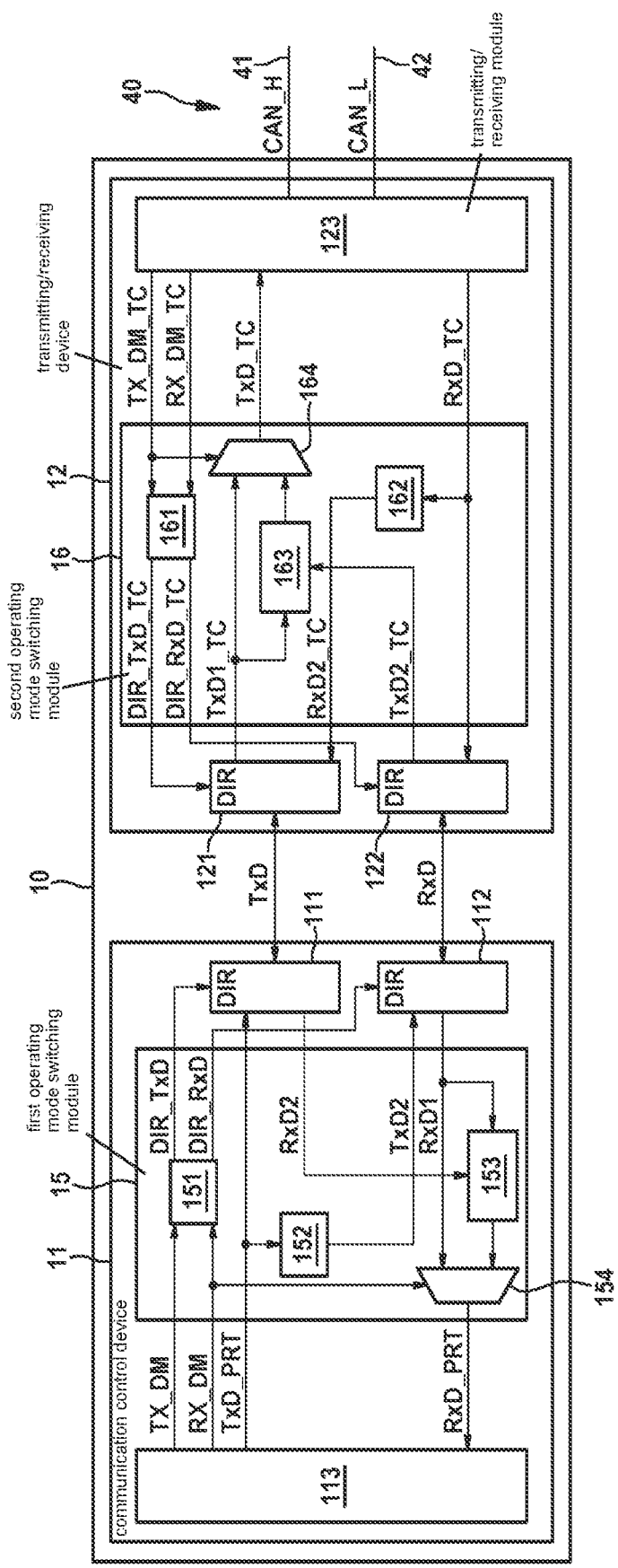
FIG. 3 is a simplified schematic block diagram of a subscriber station of the bus system according to the first exemplary embodiment of the present invention.

FIG. 1 shows, as an example, a bus system 1 that is designed in particular fundamentally for a CAN bus system, a CAN FD bus system, a CAN FD successor bus system, and/or variations thereof, as described below. The CAN FD successor bus system is referred to as CAN XL below. The bus system 1 can be used in a vehicle, in particular a motor vehicle, an aircraft, etc., or in a hospital, etc.

In FIG. 1, the bus system 1 has a plurality of subscriber stations 10, 20, 30, each of which is connected to a bus 40 having a first bus wire 41 and a second bus wire 42. The bus wires 41, 42 can also be referred to as CAN_H and CAN_L and are used for electrical signal transmission after coupling in the dominant levels or generating recessive levels for a signal in the transmit state. Messages 45, 46 in the form of signals are transmittable in a serial manner between the individual subscriber stations 10, 20, 30 via the bus 40. The subscriber stations 10, 20, 30 are, for example, control units, sensors, display devices, etc. of a motor vehicle.

As shown in FIG. 1, the subscriber station 10 has a communication control device 11, a transmitting/receiving device 12, a first operating mode switching module 15, and a second operating mode switching module 16. By contrast, the subscriber station 20 has a communication control device 21 and a transmitting/receiving device 22. The subscriber station 30 has a communication control device 31, a transmitting/receiving device 32, a first operating mode switching module 35 and a second operating mode switching module 36. The transmitting/receiving devices 12, 22, 32 of the subscriber stations 10, 20, 30 are each connected directly to the bus 40, although this is not illustrated in FIG. 1.

In each subscriber station 10, 20, 30, the messages 45, 46 are exchanged in encoded form in the form of frames via a TXD line and an RXD line bit-by-bit between the relevant communication control device 11, 21, 31 and the associated transmitting/receiving devices 12, 22, 32. This is described in more detail below.

The communication control devices 11, 21, 31 are each used to control a communication of the relevant subscriber station 10, 20, 30 via the bus 40 with at least one other subscriber station of the subscriber stations 10, 20, 30 which are connected to the bus 40.

The communication control devices 11, 31 create and read first messages 45, which are, for example, modified CAN messages 45, also referred to hereinafter as CAN XL messages 45. Here, the CAN XL messages 45 are based on a CAN FD successor format, which is described in more detail with reference to FIG. 2. The communication control devices 11, 31 may further be designed to provide or receive a CAN XL message 45 or a CAN FD message 46 to or from the transmitting/receiving devices 12, 32, as required. The communication control devices 11, 31 thus create and read a first message 45 or second message 46, wherein the first and the second message 45, 46 are distinguished by their data transmission standard, namely in this case CAN XL or CAN FD.

The communication control device 21 can be designed like a conventional CAN controller according to ISO 11898-1:2015, in particular like a CAN FD-tolerant classical CAN controller or a CAN FD controller. The communication control device 21 creates and reads second messages 46, for example classical CAN messages or CAN FD messages 46. CAN FD messages 46 can comprise a number of data bytes ranging from 0 to 64, which are also transmitted at a much faster data rate than a classical CAN message. In the latter case, the communication control device 21 is designed like a conventional CAN FD controller.

Except for the differences described in more detail below, the transmitting/receiving devices 12, 32 may be designed as CAN XL transceivers. The transmitting/receiving devices 12, 32 can additionally or alternatively be designed like a conventional CAN FD transceiver. The transmitting/receiving device 22 can be designed like a conventional CAN transceiver or CAN FD transceiver.

The two subscriber stations 10, 30 can be used to form and then transmit messages 45 using the CAN XL format and to receive such messages 45.

FIG. 2 shows a CAN XL frame 450 for the message 45, as transmitted by the transmitting/receiving device 12 or the transmitting/receiving device 32. The CAN XL frame 450 is divided into different communication phases 451 to 455 for CAN communication on the bus 40, namely an arbitration phase 451, a first switchover phase 452, a data phase 453, a second switchover phase 454 and a frame end phase 455.

In the arbitration phase 451, for example, a bit is transmitted at the beginning, which is also called the SOF bit and indicates the start of frame. In the arbitration phase 451, an identifier of, for example, 11 bits is also transmitted to identify the transmitter of the message 45. During arbitration, the identifier is used to negotiate bit-by-bit between the subscriber stations 10, 20, 30 which subscriber station 10, 20, 30 wants to transmit the message 45, 46 with the highest priority and therefore gets exclusive access to the bus 40 of the bus system 1 for the time being to transmit in the switchover phase 452 and the subsequent data phase 453.

In the first switchover phase 452, in the present exemplary embodiment, the switchover from the arbitration phase 451 to the data phase 453 is prepared. The switchover phase 452 can have a bit that has the bit duration T_B1 of a bit of the arbitration phase 451 and is transmitted at least in part with the physical layer of the arbitration phase 451. The first switchover phase 452 logically belongs to the arbitration phase 451. In particular, in this switchover phase 452, the transmitting/receiving device 12, 32 is signaled that the device 12, 32 is to switch to another operating mode, namely to the physical layer of the data phase 453.

In the data phase 453, the bits of the frame 450 are transmitted with the physical layer of the data phase 453 and with a bit duration T_B2, which is shorter than the bit duration T_B1 of a bit of the arbitration phase 451. In the data phase 453, amongst other things, the user data of the CAN XL frame 450 or the message 45 are transmitted. The user data may also be referred to as the data field of the message 45. For this purpose, in the data phase 453, after a data field identifier which identifies the type of content in the data field, a data length code, for example 11 bits long, can be transmitted. For example, the code can take on values from 1 up to 2048 or any other value with the increment of 1. The data length code can alternatively comprise fewer or more bits, so that the value range and increment can take on other values. This is followed by other fields, such as the header checksum field. Thereafter, the user data of the CAN XL frame 450 or the message 45 are transmitted. For example, at the end of the data phase 453, a checksum field can include a checksum regarding the data of the data phase 453 and the data of the arbitration phase 451. The transmitter of the message 45 can insert stuff bits into the data stream as inverse bits respectively after a predetermined number of equal bits, in particular 10 equal bits. In particular, the checksum is a frame checksum F CRC, which is used to protect all relevant bits of the frame 450 up to the checksum field. Stuff bits in data phase 453, for example, are not protected, because such bits protect the frame 450 itself and are thus used for error detection.

In the second switchover phase 454, in the present exemplary embodiment, the switchover from the data phase 453 to the frame end phase 455 is prepared. This means switching back to the transmission operating mode according to the arbitration phase 451. The switchover phase 454 can have a bit that has the bit duration T_B1 of a bit of the arbitration phase 451 and is transmitted at least in part with the physical layer of the data phase 453. The second switchover phase 454 logically belongs to the frame end phase 455, in which the same transmission operating mode is used as in the arbitration phase 451. In particular, in this second switchover phase 454, the transmitting/receiving device 12, 32 is signaled that the device 12, 32 is to switch to another operating mode, namely to the physical layer of the arbitration phase 451.

In the frame end phase 455, at least one acknowledge bit ACK can be included after two bits AL2, AH2 in an end field. This can be followed by a sequence of 7 equal bits that indicate the end of the CAN XL frame 450. With the at least one acknowledge bit ACK, a receiver can indicate whether or not it has correctly received the CAN XL frame 450 or the message 45.

At least in the arbitration phase 451 and the frame end phase 455, a physical layer is used as in CAN and CAN-FD. In addition, in the switchover phases 452, 454, a physical layer can be used as in CAN and CAN-FD at least in part, that is, in the first switchover phase 452 at the beginning and in the second switchover phase 454 at the end. The physical layer corresponds to the bit transmission layer or layer 1 of the conventional OSI (open systems interconnection) model.

An important point during such phases 451, 455 is that the conventional CSMA/CR method is used, which method allows simultaneous access of the subscriber stations 10, 20, 30 to the bus 40 without destroying the higher priority message 45, 46. This makes it relatively easy to add more bus subscriber stations 10, 20, 30 to the bus system 1, which is highly advantageous.

The CSMA/CR method implies that there must be so-called recessive states on the bus 40, which can be overwritten by other subscriber stations 10, 20, 30 with dominant states on the bus 40.

Arbitration at the beginning of a frame 450 or message 45, 46 and acknowledgment in the frame end phase 455 of the frame 450 or message 45, 46 is only possible if the bit duration or bit time is significantly more than twice as long as the signal propagation time between any two subscriber stations 10, 20, 30 of the bus system 1. Therefore, the bit rate in the arbitration phase 451, the frame end phase 454 is chosen to be slower than in the data phase 453 of the frame 450. In particular, the bit rate in phases 451, 455 is selected as 500 kbit/s, resulting in a bit duration or bit time of approximately 2 µs, whereas the bit rate in the data phase 453 is selected as 5 to 10 Mbit/s or more, resulting in a bit time of approximately 0.1 µs and shorter.

Thus, the bit time of the signal in the other communication phases 451, 452, 454, 455 is greater than the bit time of the signal in the data phase 453 by at least a factor of 10.

A transmitter of the message 45, for example the subscriber station 10, starts a transmission of bits of the switchover phase 452 and the subsequent data phase 453 to the bus 40 only after the subscriber station 10 as the transmitter has won the arbitration and the subscriber station 10 as the transmitter thus has an exclusive access to the bus 40 of the bus system 1 for transmission. The transmitter can either switch to the faster bit rate and/or the other physical layer after a part of the switchover phase 452 or switch to the faster bit rate and/or the other physical layer only with the first bit, i.e., with the start, of the subsequent data phase 453.

Generally speaking, the following different properties can be realized in the bus system with CAN XL compared to CAN or CAN FD:
 a) adoption and, if necessary, adaptation of proven features responsible for the robustness and user-friendliness of CAN and CAN FD, in particular frame structure with identifier and arbitration according to the CSMA/CR method,
 b) increase in the net data transmission rate to approximately 10 megabits per second,
 c) increase in the size of the user data per frame to approximately 2 Kbyte or to any value.

FIG. 3 shows the basic structure of the subscriber station 10 with the communication control device 11, the transmitting/receiving device 12 and the operating mode switching modules 15, 16. The operating mode switching module 15 of the communication control device 11 is structured to be symmetrical to the operating mode switching module 16 of the transmitting/receiving device 12. The operating mode switching module 15 can also be called the first operating mode switching module. The operating mode switching module 16 can also be called the second operating mode switching module.

The subscriber station 30 is constructed in a similar manner as shown in FIG. 3, except that the block 35 is not integrated into the communication control device 31, but is provided separately from the communication control device 31 and the transmitting/receiving device 32. Therefore, the subscriber station 30 and the block 35 are not described separately. The functions of the operating mode switching module 15 described below are identically present in the operating mode switching module 35. The functions of the operating mode switching module 16 described below are identically present in the operating mode switching module 36.

Alternatively or additionally, it is possible that the block 16 is not integrated into the transmitting/receiving device 12, but is provided separately from the communication control device 11 and the transmitting/receiving device 12.

The transmitting/receiving device 12 is connected to the bus 40, more specifically its first bus wire 41 for CAN_H and its second bus wire 42 for CAN_L. In the operation of the bus system 1, the transmitting/receiving device 12 converts a transmitted signal TxD of the communication control device 11 into corresponding signals CAN_H and CAN_L for the bus wires 41, 42 and transmits these signals CAN_H and CAN_L to the bus 40. Even though the signals CAN_H and CAN_L are mentioned here for the transmitting/receiving device 12, these are to be understood in relation to the message 45 as signals CAN-XL_H and CAN-XL_L which in the data phase 453 deviate from the conventional signals CAN_H and CAN_L in at least one feature, in particular in relation to the formation of the bus states for the various data states of the signal TxD and/or in relation to the voltage or the physical layer and/or the bit rate.

A differential signal VDIFF=CAN_H−CAN_L is formed on the bus 40. With the exception of an idle or standby state, the transmitting/receiving device 12 with its receiver always listens for a transmission of data or messages 45, 46 on the bus 40 during normal operation, regardless of whether or not the subscriber station 10 is the transmitter of the message 45. The transmitting/receiving device 12 forms a received signal RxD from the CAN_H and CAN_L signals received from the bus 40 and passes it to the communication control device 11, as described in more detail below.

The structure of the subscriber station 10 described below provides a robust and simple possibility of symmetrically transmitting bits by means of signals between the communication control device 11 and the transmitting/receiving device 12, that is, without the bits changing in their duration. This is particularly advantageous during the transmission of data during the data phase 453 of a frame 450.

According to FIG. 3, in addition to the operating mode switching module 15, the communication control device 11 has a first bidirectional terminal 111 for a digital transmitted signal TxD, a second bidirectional terminal 112 for a digital received signal RxD and a communication control module 113. In addition to the operating mode switching module 16, the transmitting/receiving device 12 has a first bidirectional terminal 121 for the digital transmitted signal TxD, a second bidirectional terminal 122 for the digital received signal RxD and a transmitting/receiving module 123. The terminals 111, 112, 121, 122 are bidirectionally operable by means of the modules 15, 16 and corresponding signals, namely switchable as either outputs or inputs, as described below.

The communication control device 11 is designed as a microcontroller or has a microcontroller. The communication control device 11 processes signals from any application, for example a control device for an engine, a safety system for a machine or vehicle, or other applications. Not shown, however, is a system ASIC (application-specific integrated circuit), which can alternatively be a system basis chip (SBC) on which several functions necessary for an electronics assembly of the subscriber station 10 are combined. The system ASIC may include, amongst other things, the transmitting/receiving device 12 and a power supply device (not shown), which supplies electrical power to the transmitting/receiving device 12. The power supply device usually supplies a CAN Supply voltage of 5 V. However, as required, the power supply device can supply a different voltage with a different value and/or can be designed as a current source.

The communication control module 113 is a protocol controller that implements the CAN protocol, in particular the protocol for CAN XL or CAN FD. The communication control module 113 is designed to output the following output signals or receive the following input signals.

The signal TxD_PRT is an output signal that corresponds to the transmitted signal TxD. The signal RxD_PRT is an input signal that corresponds to the received signal RxD.

In addition to these signals, the communication control module 113 is designed to generate and output the following control signals TX_DM, RX_DM.

The control signal TX_DM is an output signal and indicates whether or not the transmitting/receiving device 12 is to operate in the operating mode TX-DataPhaseMode. The operating mode is also called FAST_TX mode or first operating mode. In the operating mode TX-DataPhaseMode, the subscriber station 10 has won the arbitration in the arbitration phase 451 and is the transmitter of the frame 450 in the subsequent data phase 453. In this case, the subscriber station 10 can also be referred to as a transmitting node. In the operating mode TX-DataPhaseMode, the transmitting/receiving device 12 is to use the physical layer for data phase 453, driving the bus wires CAN_H and CAN_L in doing so.

The RX_DM control signal is an output signal and indicates whether or not the transmitting/receiving device 12 is to operate in the operating mode RX-DataPhaseMode. The operating mode is also called FAST_RX mode or second operating mode. In the operating mode RX-DataPhaseMode, the subscriber station 10 has lost arbitration in the arbitration phase 451 and is only a receiver, not a transmitter, of the frame 450 in the subsequent data phase 453. In this case, the subscriber station 10 can also be referred to as the receiving node. In the operating mode RX-DataPhaseMode, the transmitting/receiving device 12 is to use the physical layer for the data phase 453, but is not to drive the bus wires CAN_H and CAN_L.

If the transmitting/receiving device is neither in TX-DataPhaseMode nor in RX-DataPhaseMode, it is in so-called ArbitrationPhaseMode, that is, the operating mode used in the arbitration phase 451 and the frame end phase 455. In this mode, the physical layer with which dominant and recessive bus states can be transmitted is used.

The circuitry for signaling the operating mode to be turned on to the transmitting/receiving device 12 is not shown here. In particular, signaling is also performed via the TxD terminal 111 and/or RxD terminal 112.

The operating mode switching module 15 has a direction control block 151, an encoding block 152, a decoding block 153 and a multiplexer 154. The first operating mode switching module 15 receives the aforementioned signals output by the communication control module 113.

The direction control block 151 generates the switching signals DIR_TxD and DIR_RxD from the control signals TX_DM, RX_DM of the communication control module 113. The switching signal DIR_TxD controls the direction DIR, more precisely the transmission direction, of the first bidirectional switchable terminal 111 of the communication control device 11. In other words, the switching signal DIR_TxD controls the direction of the TxD terminal 111 of the device 11. The switching signal DIR RxD controls the direction DIR, more precisely the transmission direction, of the second bidirectional switchable terminal 112 of the communication control device 11. In other words, the switching signal DIR_RxD controls the direction of the RxD terminal 112 of the device 11.

In this case, if the signal TX_DM is set, in particular if its signal value is equal to 1, the direction of the TxD terminal 111 and the direction of the RxD terminal 112 are switched to output. As a result, the communication control module 113 can transmit a frame 450 to be transmitted to the bus 40 as a differential signal via the terminals 111, 112, as described in more detail below. In particular, if the communication control module 113 transmits a frame 450 and the signal TX_DM is set in doing so, the direction of the TxD terminal 111 and the direction of the RxD terminal 112 are switched to output.

If the RX_DM signal is set, in particular if its signal value is equal to 1, the direction of the TxD terminal 111 and the direction of the RxD terminal 112 are switched to input. As a result, the communication control module 113 can receive a frame 450 transmitted via the bus 40 as a differential signal via the terminals 111, 112, as described in more detail below. In particular, if the communication control module 113 receives a frame 450 and the RX_DM signal is set in doing so, the direction of the TxD terminal 111 and the direction of the RxD terminal 112 are switched to input.

The encoding block 152 generates a signal TxD2 from the signal TxD PRT, that is, the transmitted signal TxD. The signal TxD2 is an inverse signal to the signal TxD PRT. The encoding block 152 outputs the signal TxD2 to the terminal 112. If the terminals 111, 112 are switched to output as previously described, the communication control device 11 can output the signals TxD PRT, TxD2 as a differential output signal to the transmitting/receiving device 12 via the terminals 111, 112. In the simplest case, the encoding block 152 is an inverter that inverts the signal TxD PRT.

The decoding block 153 is connected at its input to the terminals 111, 112. If the terminals 111, 112 are switched to input as previously described, the decoding block 153 receives from the terminals 111, 112 a differential input signal consisting of a signal RxD1 and a signal RxD2. The decoding block 153 decodes the signals RxD1, RxD2 into the non-differential signal RxD PRT. The decoding block 153 outputs the signal RxD PRT to the multiplexer 154.

The communication control module 113 controls the multiplexer 154 with the control signal RX_DM. Depending on the signal value of the control signal RX_DM, there is a selection of whether the signal decoded by the decoding block 153 or the signal RxD1 from the terminal 112 is provided to the communication control module 113 as the signal RxD PRT.

In the transmitting/receiving device 12, the transmitting/receiving module 123 is designed to transmit and/or receive messages 45, 46 according to the CAN protocol, in particular messages according to the protocol for CAN XL or CAN FD, as previously described. The transmitting/receiving module 123 performs the linkage to the physical medium, that is, the bus 40 with the bus wires 41, 42. The transmitting/receiving module 123 drives and decodes the CAN_H and CAN_L signals for the bus wires 41, 42 and the bus 40, respectively. The transmitting/receiving module 123 is further designed to output the following output signals or receive the following input signals.

The signal RxD_TC is an output signal that corresponds to a digital received signal which is generated by the transmitting/receiving device module 123 from the differential signal CAN_H, CAN_L from the bus 40. The signal TxD_TC is an input signal that corresponds to the transmitted signal TxD, which is the signal generated by the communication control module 113 for transmission to the bus 40.

In addition to these signals, the transmitting/receiving module 123 is designed to generate and output the following control signals TX_DM_TC, RX_DM TC.

The control signal TX_DM_TC is an output signal and indicates whether or not the transmitting/receiving device 12 is operating or switched in the operating mode TX-DataPhaseMode in order to act as a transmitter of the frame 450 in the data phase 453, as previously described. This is an operating mode in which the transmitting/receiving module 123 transmits bits on the bus 40 during the data phase 453, that is, drives the bus 40.

The control signal RX_DM TC is an output signal and indicates whether or not the transmitting/receiving device 12 is operating or switched in the operating mode RX-DataPhaseMode in order to act only as a receiver, not a transmitter, of the frame 450 in the data phase 453, as previously described. This is an operating mode in which the transmitting/receiving module 123 receives bits only from the bus 40 in the data phase 453, that is, does not drive the bus 40.

The second operating mode switching module 16 has a direction control block 161, an encoding block 162, a decoding block 163 and a multiplexer 164. The second operating mode switching module 16 receives the aforementioned signals output by the transmitting/receiving module 123.

The direction control block 161 generates the switching signals DIR_TxD_TC and DIR RxD_TC from the control signals TX_DM_TC, RX_DM_TC of the transmitting/receiving module 123. The switching signal DIR_TxD_TC controls the direction DIR, more precisely the transmission direction, of the first bidirectional switchable terminal 121 of the transmitting/receiving device 12. In other words, the switching signal DIR_TxD_TC controls the direction of the TxD terminal 121 of the device 12. The switching signal DIR_RxD_TC controls the direction DIR, more precisely the transmission direction, of the second bidirectional switchable terminal 122 of the transmitting/receiving device 12. In other words, the switching signal DIR_RxD_TC controls the direction of the RxD terminal 122 of the device 12.

In this case, if the RX_DM_TC signal is set, in particular if its signal value is equal to 1, the direction of the TxD terminal 121 and the direction of the RxD terminal 122 are switched to output. As a result, the transmitting/receiving module 123 can transmit a frame 450 transmitted by another subscriber station via the bus 40 as a differential signal to the communication control device 11 via the terminals 121, 122, as described in more detail below. In particular, if the transmitting/receiving module 123 receives a frame 450 and if the RX_DM_TC signal is set in doing so, the direction of the TxD terminal 121 and the direction of the RxD terminal 122 are switched to output.

If the signal TX_DM_TC is set, in particular if its signal value is equal to 1, the direction of the TxD terminal 121 and the direction of the RxD terminal 122 are switched to input. As a result, the transmitting/receiving module 123 can receive a frame 450 to be transmitted to the bus 40 as a differential signal from the communication control device 11 via its terminals 121, 122. In particular, if the transmitting/receiving module 123 transmits a frame 450 to the bus 40 and the signal TX_DM_TC is set in doing so, the direction of the TxD terminal 121 and the direction of the RxD terminal 122 are switched to input.

The encoding block 162 generates a signal RxD2_TC from the signal RxD_TC, that is, the received signal RxD. The RxD2_TC signal is an inverse signal to the RxD_TC signal. The encoding block 162 outputs the RxD2_TC signal to the terminal 121. If the terminals 121, 122 are switched to output as described previously, the transmitting/receiving device 12 can output the signals RxD2_TC, RxD_TC as a differential output signal to the communication control device 11 via the terminals 121, 122. In the simplest case, the encoding block 162 is an inverter that inverts the signal RxD_TC.

The decoding block 163 is connected at its input to the terminals 121, 122. If the terminals 121, 122 are switched to input as previously described, the decoding block 163 receives a differential input signal consisting of a signal TxD1_TC and a signal TxD2_TC from the terminals 121, 122. The decoding block 163 decodes the signals TxD1_TC, TxD2_TC into the non-differential signal TxD_TC. The decoding block 163 outputs the signal TxD_TC to the multiplexer 154.

The transmitting/receiving module 123 controls the multiplexer 164 with the control signal TX_DM_TC. Depending on the signal value of the control signal TX_DM_TC, there is a selection as to whether the signal decoded by the decoding block 163 or the signal TxD1_TC from the terminal 121 is provided to the transmitting/receiving module 123 as the signal TxD_TC.

Accordingly, in the operating mode TX-DataPhaseMode, as previously described, the communication control device 11 transmits the bit stream of the serial transmitted signal TxD as a differential signal via the TxD and RxD terminals 111, 112. The transmitting/receiving device 12 receives this differential signal at its TxD and RxD terminals 121, 122 and decodes this differential signal into a non-differential signal TxD_TC.

FIG. 4 to FIG. 7 show an example of the signal courses of the previously described signals in the communication control device 11, if the subscriber station 10 is the transmitter of the message 45 and thus the transmitting/receiving device 12 is switched to the operating mode TX-DataPhaseMode in the data phase 453. In this case, in FIG. 6 and FIG. 7, the designation "P1" stands for input and the designation "P2" stands for output.

According to FIG. 4 to FIG. 7, the communication control device 11 and the transmitting/receiving device 12 use the terminals 111, 112, 121, 122 of the subscriber station 10 to transmit data during the arbitration phase 451 as usual. The communication control device 11 transmits by means of the TxD terminal 111 and simultaneously receives the data by means of the RxD terminal 112 from the bus 40.

In the faster operating mode of the transmitting/receiving device 12, the subscriber station 10 transmits as a transmitting node only, as shown in FIG. 4 to FIG. 7.

It is also the case that the subscriber station 10, as a receiving node, receives exclusively in the faster operating mode of the transmitting/receiving device 12, as shown in FIG. 8 to FIG. 11. FIG. 8 to FIG. 11 show an example of the signal courses of the previously described signals in the communication control device 11, if the subscriber station 10 is not a transmitter of the message and thus the transmitting/receiving device 12 is switched to the operating mode RX-DataPhaseMode. In FIG. 10 and FIG. 11, the designation "P1" stands for input and the designation "P2" stands for output. Accordingly, in the operating mode RX-DataPhaseMode, as previously described, the transmitting/receiving device 12 transmits the bit stream of the serial received signal RxD as a differential signal via the TxD and RxD terminals 121, 122. The communication control device 11 receives this differential signal at its TxD and RxD terminals 111, 112 and decodes this differential signal into the non-differential signal RxD PRT. In addition, during the arbitration phase 451 and the frame end phase 455, data is transmitted via the terminals 111, 112, 121, 122 as previously described for FIGS. 4 to 7.

In contrast to the phases 451, 455 of a frame 450 and to CAN FD, the simultaneous transmission and reception on the CAN bus 40 in the operating modes RX-DataPhaseMode, TX-DataPhaseMode of the transmitting/receiving device 12 is thus no longer necessary for the subscriber stations 10, 30 in the data phase 453. In this case, during the time when the transmitting/receiving device 12 is in an operating mode of the data phase 453, the communication control device 11 and the transmitting/receiving device 12 use the two terminals 111, 112, 121, 122 for the signals RxD, TxD in the same direction, in order to transmit a differential transmitted signal TxD (first operating mode of the data phase 453) or a differential received signal RxD (second operating mode of the data phase 453).

According to a first modification of the aforementioned embodiment of the modules 15, 16, it is possible that at least one of the modules 15, 16 only enables switching to the operating mode TX-DataPhaseMode. Such a variant can be advantageous, for example, in the case of a subscriber station 10, 20 of the bus system 1 which itself only needs to transmit signals, but does not need to receive signals from the bus 40 in order to carry out its function. An example of the embodiment of such a subscriber station is a pure control element, the control of which is transmitted via the bus 40, but which receives or generates the event for the control independently of the communication on the bus.

According to a second modification of the aforementioned embodiment of the modules 15, 16, it is possible that at least one of the modules 15, 16 only enables switching to the operating mode RX-DataPhaseMode. Such a variant can be advantageous, for example, in the case of a subscriber station 10, 20 of the bus system 1 which itself does not need to transmit signals, but only needs to receive signals from the bus 40 in order to carry out its function. An example of the embodiment of such a subscriber station is an encoder, in particular a rotary encoder, actuator, etc.

Of course, the previously described functions of the devices 11, 12 can also be used for another modification of CAN FD and/or CAN, at least for transmitting the user data.

As a consequence of the embodiment of the subscriber station 10, no galvanic connection through an additional terminal at each of the communication control device 11 and the transmitting/receiving device 12 connected thereto is required, so that the symmetry of the data transmission between the devices 11, 12 can be ensured. That is, advantageously, no additional terminal that is not available on a standard housing of the devices 11, 12 is required. Therefore, a change to another, larger and cost-intensive, housing is not necessary to provide an additional terminal.

Through the described embodiment of the device(s) 11, 12, 32, 35, much higher data rates can be achieved in the data phase 453 than with CAN or CAN-FD. In addition, the data length in the data field of data phase 453 can be arbitrarily selected, as previously described. This means that the advantages of CAN in terms of arbitration can be retained and yet a larger number of data can be transmitted very securely and thus effectively in a shorter time than before.

FIG. 12 to FIG. 16 show signal courses at the subscriber station 10 in a second exemplary embodiment. Here, the transition between the data phase 453 and the frame end phase 455 is shown if the subscriber station 10 is a transmitter of the frame 450. In the frame end phase 455, the transmission operating mode corresponds to the arbitration phase 451. According to FIG. 15, in the frame end phase 455, the communication control device 11 transmits by means of the TxD terminal 111, so that the terminal 111 is set to output (designation P2), and simultaneously receives the data from the bus 40 by means of the RxD terminal 112, so that the terminal 111 is set to input (designation P1), as shown in FIG. 16.

However, during the operating mode TX-DataPhaseMode in the data phase 453, the communication control device 11 uses its two terminals 111, 112 as outputs (designation P2 in FIG. 15 and FIG. 16) and the transmitting/receiving device 12 uses its two terminals 121, 122 as inputs (designation P1). As a result, in the data phase 453, a differential signal TxD PRT, TxD2 is transmitted from the terminals 111, 112 to the terminals 121, 122, which are designated as TxD, RxD in FIG. 13 and FIG. 14. The signal TxD according to FIG. 13 at the terminal 111 has bits with a bit duration T_B2. The signal RxD according to FIG. 14 at the terminal 112 also has bits with the bit duration T_B2, since it corresponds to the inverse TxD signal.

If it is desired to switch from the operating mode TX-DataPhaseMode in the data phase 453 to the operating mode of the arbitration phase 451, the ArbitrationPhaseMode, in which the signals TxD, RxD are transmitted with a bit duration T_B1 (FIG. 13), the operating mode switching module 15 is designed to transmit a non-differential signal via its two terminals 111, 112 to signal the switch, as shown in FIG. 13 and FIG. 14. For example, the operating mode switching module 15 transmits the signals TxD=RxD=1 for this purpose via its two terminals 111, 112 for a predetermined time period T as signaling S in the switchover phase 454, as shown in FIG. 13 and FIG. 14. The predetermined time period T is at least, for example, T=100 ns.

This allows the transmitting/receiving device 12 to recognize that the transmitting/receiving device 12 is now to switch its operating mode to the operating mode of arbitration phase 451.

In the previously described example, the signaling S for switching occurs while the CAN bus 40 is at the "Data-1" or "recessive" level. Therefore, no conflict or short circuit occurs at the RxD terminal 112, 122 when the transmitting/receiving device 12 begins to drive the RxD line between the transmitting/receiving device 12 and the communication control device 11. If the signaling S for switching the operating mode of the transmitting/receiving device 12 is to be performed at the inverse level on the CAN bus 40, the communication control device 11 is designed to perform the signaling S for switching by transmitting the levels TxD=RxD=0.

By contrast to the switchover to the frame end phase 455, in the present exemplary embodiment, a signaling of the operating mode change from the arbitration phase 451 to the data phase 453, that is, to one of the operating modes RX-DataPhaseMode, TX-DataPhaseMode of the transmitting/receiving device 12, can be performed via the RxD terminal 112. For the purpose of signaling the operating mode change, the communication control device 11 for a short time drives the RxD terminal 112 more strongly than the transmitting/receiving device 12 drives its RxD terminal 122. This avoids the possibility that the value of the RxD line could be indeterminate if both the communication control device 11 drives its RxD terminal 112 and the transmitting/receiving device 12 drives its RxD terminal 122 and there is a superimposition of the two signal sources at terminals 112, 122. Thus, when the two signal sources at terminals 112, 122 are superimposed in this manner, the communications control device 11 always prevails. Thus, the value of the RxD line is always determinate.

The second exemplary embodiment therefore also has the advantage that no further terminal or pin or port is required for the devices 11, 12, and therefore the solution is very cost-effective.

Otherwise, communication can take place in the subscriber stations 10, 30 and in the bus system 1 as described with respect to the first exemplary embodiment.

According to a third exemplary embodiment, the transmitting/receiving device 12 and/or the transmitting/receiving device 32, in particular the operating mode switching module 15 and/or the operating mode switching module 16, can be designed to signal something to the communication control device 11, in particular the communication control module 113, upon receipt in the operating mode RX-Data- PhaseMode. For this purpose, in an additional operating mode of the data phase 453, the transmitting/receiving device 12, 32 transmits a non-differential signal via the TxD and RxD terminals 121, 122 as described with respect to the second exemplary embodiment for the terminals 111, 112. For example, the transmitting/receiving device 12, 32 can transmit the following levels as signaling S at the terminals 121, 122: TxD=RxD=1.

The signaling S of the transmitting/receiving devices 12, 32 can contain or can be additional information which is additional to information of the signals exchanged in the bus system 1 with the messages 45, 46 between the subscriber stations 10, 30 of the bus system 1. The additional information enables internal communication of the devices 11, 12 or the devices 31, 32.

Otherwise, communication can take place in the subscriber stations 10, 30 and in the bus system 1 as described with respect to the first or second exemplary embodiment.

All of the previously described embodiments of the devices 11, 12, 31, 32, the modules 15, 16, 35, 36, the subscriber stations 10, 20, 30, the bus system 1 and the method carried out therein can be used individually or in all possible combinations. In particular, all features of the previously described exemplary embodiments and/or modifications thereof may be combined as desired. In addition or alternatively, the following modifications are particularly possible.

Even though the present invention is previously described using the CAN bus system as an example, the present invention can be used with any communication network and/or communication method with which two different communication phases, in which the bus states generated for the different communication phases differ, are used. In particular, the principle of the present invention previously described can be used for interfaces that require a switching signal from a protocol controller or module 113 for different communication phases and/or in the process require data exchange between devices 11, 12.

The previously described bus system 1 according to the exemplary embodiments is described on the basis of a bus system based on the CAN protocol. However, the bus system 1 according to the exemplary embodiments can also be another type of communication network in which data can be transmitted in a serial manner at two different bit rates. It is advantageous, but not a necessary requirement, that exclusive, collision-free access of a subscriber station 10, 20, 30 to a common channel is ensured in the bus system 1 at least for certain periods of time.

The number and arrangement of the subscriber stations 10, 20, 30 in the bus system 1 of the exemplary embodiments is arbitrary. In particular, the subscriber station 20 can be omitted from the bus system 1. It is possible that one or more of the subscriber stations 10 or 30 are present in the bus system 1. It is possible that all subscriber stations in the bus system 1 have the same design, that is, only the subscriber station 10 or only the subscriber station 30 is present.

What is claimed is:

1. A communication control device for a subscriber station of a serial bus system, comprising:
    a communication control module configured to generate a transmitted signal for controlling a communication of the subscriber station with at least one other subscriber station of the bus system, in which bus system at least a first communication phase and a second communication phase are used for exchanging messages between subscriber stations of the bus system;
    a first terminal for transmitting, in an operating mode of the first communication phase, the transmitted signal to a transmitting/receiving device which is configured to transmit the transmitted signal to a bus of the bus system;
    a second terminal for receiving, in the operating mode of the first communication phase, a digital received signal from the transmitting/receiving device; and
    an operating mode switching module configured to switch a transmission direction of the first terminal and the second terminal to the same direction in the second communication phase for differential signal transmission via the first terminal and the second terminal.

2. The communication control device according to claim 1, wherein:
    the operating mode switching module is configured to, in a first operating mode of the second communication phase, switch the first terminal and the second terminal as outputs, generate an inverse digital transmitted signal from the transmitted signal, and output the transmitted signal at the first terminal and the inverse digital transmitted signal at the second terminal, and/or
    the operating mode switching module is configured to, in a second operating mode of the second communication phase, switch the first and the second terminal as inputs, generate a non-differential received signal from a received differential signal received at the first terminal and the second terminal, and output the non-differential received signal to the communication control module.

3. The communication control device according to claim 2, wherein the operating mode switching module is configured to, in the first operating mode of the second communication phase, generate and output the transmitted signal and the inverse digital transmitted signal with the same level at the first terminal and the second terminal, for a predetermined time period, and signal to the transmitting/receiving device that an operating mode of the transmitting/receiving device is to be switched from the first operating mode of the second communication phase to the operating mode of the first communication phase.

4. The communication control device according to claim 1, wherein the operating mode switching module is configured to signal to the transmitting/receiving device, via the first terminal or the second terminal, that the transmitting/receiving device is to switch its operating mode from the operating mode of the first communication phase to a predetermined operating mode of the second communication phase.

5. The communication control device according to claim 1, wherein the communication control module is configured to generate the transmitted signal in the first communication phase with bits having a first bit time that is greater by at least a factor of 10 than a second bit time of bits that the communication control module generates in the transmitted signal in the second communication phase.

6. The communication control device according to claim 1, wherein the operating mode switching module includes:
    a direction control block configured to control the transmission direction of the first and the second terminal depending on an operating mode of the transmitting/receiving device;
    an encoding block configured to encoding differential signals;
    a decoding block configured to decoding differential signals at the first and the second terminal into a non-differential signal; and a multiplexer configured to outputting the non-differential signal generated by the decoding block if the transmitting/receiving device is switched to an operating mode of the second communication phase.

7. The communication control device according to claim 1, wherein a signal received from the bus in the first communication phase is generated with a different physical layer than a signal received from the bus in the second communication phase.

8. The communication control device according to claim 1, wherein in the first communication phase, there is a negotiation as to which of the subscriber stations of the bus system will be given at least temporarily exclusive, collision-free access to the bus in a subsequent second communication phase.

9. A transmitting/receiving device for a subscriber station of a serial bus system, comprising:
  a transmitting/receiving module configured to transmit a transmitted signal to a bus of the bus system, in which bus system at least a first communication phase and a second communication phase are used for exchanging messages between subscriber stations of the bus system, and generate a digital received signal from a signal received from the bus;
  a first terminal configured to receive, in an operating mode of the first communication phase, the transmitted signal from a communication control device;
  a second terminal configured to transmit, in the operating mode of the first communication phase, the digital received signal to the communication control device; and
  an operating mode switching module configured to switch the transmission direction of the first terminal and the second terminal to the same direction in the second communication phase for differential signal transmission via the first terminal and the second terminal.

10. The transmitting/receiving device according to claim 9, wherein:
  the operating mode switching module is configured to, in a first operating mode of the second communication phase, switch the first and the second terminal as inputs and generate a non-differential transmitted signal from a differential digital transmitted signal received at the first terminal and the second terminal, and/or
  the operating mode switching module is configured to, in a second operating mode of the second communication phase, switch the first terminal and the second terminal as outputs, generate an inverse digital received signal from the digital received signal, and output the digital received signal at the second terminal and the inverse digital received signal at the first terminal.

11. The transmitting/receiving device according to claim 10, wherein the operating mode switching module is configured to, in the second operating mode of the second communication phase, generate and output the digital received signal and the inverse digital received signal with the same level at the terminal and the second terminal for a predetermined time period, to signal to the communication control device additional information that is additional to information of signals that are exchanged in the bus system with the messages between subscriber stations of the bus system.

12. The transmitting/receiving device according to claim 9, wherein the transmitting/receiving module is configured to transmit the transmitted signal as a differential signal to the bus.

13. The communication control device according to claim 1, wherein the operating mode switching module is configured to select the transmission direction of the first terminal and the second terminal depending on an operating mode to which the transmitting/receiving device is switched.

14. A bus system, comprising:
  a bus; and
  at least two subscriber stations, which are interconnected via the bus in such a way that they can communicate with one another in a serial manner and of which at least one subscriber station includes:
    a communication control device, including:
      a communication control module configured to generate a transmitted signal for controlling a communication of the subscriber station with at least one other subscriber station of the bus system, in which bus system at least a first communication phase and a second communication phase are used for exchanging messages between subscriber stations of the bus system,
      a first terminal for transmitting, in an operating mode of the first communication phase, the transmitted signal to a transmitting/receiving device,
      a second terminal for receiving, in the operating mode of the first communication phase, a digital received signal from the transmitting/receiving device, and
      a first operating mode switching module configured to switch a transmission direction of the first terminal and the second terminal to the same direction in the second communication phase for differential signal transmission via the first terminal and the second terminal; and
    a transmitting/receiving device, including:
      a transmitting/receiving module configured to transmit the transmitted signal to the bus, and generate the digital received signal from a signal received from the bus,
      a third terminal configured to receive, in the operating mode of the first communication phase, the transmitted signal from the communication control device,
      a fourth terminal configured to transmit, in the operating mode of the first communication phase, the digital received signal to the communication control device, and
      a second operating mode switching module configured to switch the transmission direction of the third terminal and the fourth terminal to the same direction in the second communication phase for differential signal transmission via the third terminal and the fourth terminal.

15. A method for providing communication in a serial bus system having subscriber stations, the method comprising:
  switching, with a first operating mode switching module of a communication control device, a transmission direction of a first terminal and a second terminal of the communication control device in the second communication phase to the same direction, and
  switching, with a second operating mode switching module of a transmitting/receiving device, the transmission direction of a third terminal and a fourth terminal of the transmitting/receiving device in the second communication phase to the same direction, which is different from the direction in which the first terminal and the second terminal for the communication controller are switched, and carrying out differential signal transmission between the communication control device and the transmitting/receiving device via the first terminal and the second terminal of the communication control device and the third terminal and the fourth terminal of the transmitting/receiving device;

wherein the subscriber station includes:

the communication control device, including:

the communication control module, which is configured to generate a transmitted signal for controlling a communication of the subscriber station with at least one other subscriber station of the bus system, in which at least the first communication phase the second communication phase are used for exchanging messages between the subscriber stations of the bus system, the first terminal for transmitting, in an operating mode of the first communication phase, the transmitted signal to the transmitting/receiving device, the second terminal for receiving, in the operating mode of the first communication phase, a digital received signal from the transmitting/receiving device, and the first operating mode switching module, which is configured to switch a transmission direction of the first terminal and the second terminal to the same direction in the second communication phase for differential signal transmission via the first terminal and the second terminal; and the transmitting/receiving device, including:

a transmitting/receiving module, which is configured to transmit the transmitted signal to the bus, and generate the digital received signal from a signal received from the bus, the third terminal, which is configured to receive, in the operating mode of the first communication phase, the transmitted signal from the communication control device, the fourth terminal, which is configured to transmit, in the operating mode of the first communication phase, the digital received signal to the communication control device, and the second operating mode switching module, which is configured to switch the transmission direction of the third terminal and the fourth terminal to the same direction in the second communication phase for differential signal transmission via the third terminal and the fourth terminal.

* * * * *